United States Patent
Ocke

(10) Patent No.: US 7,054,651 B2
(45) Date of Patent: May 30, 2006

(54) SYSTEM AND METHOD FOR PROVIDING A SITE SPECIFIC LOCATION OF A DEVICE

(75) Inventor: Kirk J. Ocke, Ontario, NY (US)

(73) Assignee: Xerox Corporation, Stamford, CT (US)

(*) Notice: Subject to any disclaimer, the term of this patent is extended or adjusted under 35 U.S.C. 154(b) by 227 days.

(21) Appl. No.: 10/757,318

(22) Filed: Jan. 14, 2004

(65) Prior Publication Data

US 2005/0153711 A1    Jul. 14, 2005

(51) Int. Cl.
*H04Q 7/20* (2006.01)

(52) U.S. Cl. .............................. 455/456.3; 455/456.1; 455/344; 709/217

(58) Field of Classification Search ............ 455/456.3, 455/456.1, 456.6, 414.1, 344; 709/217, 227, 709/228; 701/207, 213–216; 342/352, 357.01
See application file for complete search history.

(56) References Cited

U.S. PATENT DOCUMENTS

| | | | |
|---|---|---|---|
| 6,122,520 A | 9/2000 | Want et al. | |
| 2003/0018744 A1* | 1/2003 | Johanson et al. | 709/217 |
| 2003/0142016 A1* | 7/2003 | Pickup | 342/387 |
| 2004/0098471 A1* | 5/2004 | Shima | 709/221 |

* cited by examiner

*Primary Examiner*—Melur Ramakrishnaiah
(74) *Attorney, Agent, or Firm*—Nixon Peabody LLP

(57) ABSTRACT

A system for providing a site specific location of a device, such as a particular piece of office equipment or medical equipment, includes a receiving system, a conversion system, and an output system. The receiving system receives coordinate information from a device. The conversion system converts the received coordinate information to site specific location information of the device. The output system outputs the site specific location information of the device.

30 Claims, 2 Drawing Sheets

SYSTEM AND METHOD FOR PROVIDING A SITE SPECIFIC LOCATION OF A DEVICE

FIELD

The present invention relates to location systems and methods and, more particularly, to a system and method for providing a site specific location of a device with an embedded indoor positioning system.

BACKGROUND

Currently, when an administrator installs or configures equipment, such as a printer or copier, the administrator manually records the location of the equipment at a given site. For example, during the installation of a printer, an administrator would manually record the building and room number where the printer was installed. At a later time, the administrator will enter and store the location information of that printer in a system accessible by potential users of the printer.

Unfortunately, equipment is often moved from one location to another location and when this occurs the location information is not always updated or is incorrectly recorded. Outdated or incorrectly recorded, location information is particularly problematic when trying to track critical equipment which is portable. For example, within a hospital accurate information about the location of portable medical equipment is crucial for providing the highest level of health care.

SUMMARY

A system for providing a site specific location of a device in accordance with embodiments of the present invention includes a receiving system, a conversion system, and an output system. The receiving system receives coordinate information from a device. The conversion system converts the received coordinate information to site specific location information of the device. The output system outputs the site specific location information of the device.

A method and a computer readable medium having stored thereon instructions for providing a site specific location of a device in accordance with embodiments of the present invention includes receiving coordinate information from a device. The received coordinate information is converted to site specific location information of the device. The site specific location information of the device is output.

The present invention provides a system and method for providing site specific, geographical information about the location of a device, such as a particular piece of office or medical equipment. With the present invention, human error in the identification of the physical location of a particular device is eliminated because the identification takes place automatically. The present invention also enables the tracking of equipment that are not normally connected to a network.

DETAILED DESCRIPTION

Figure 1:
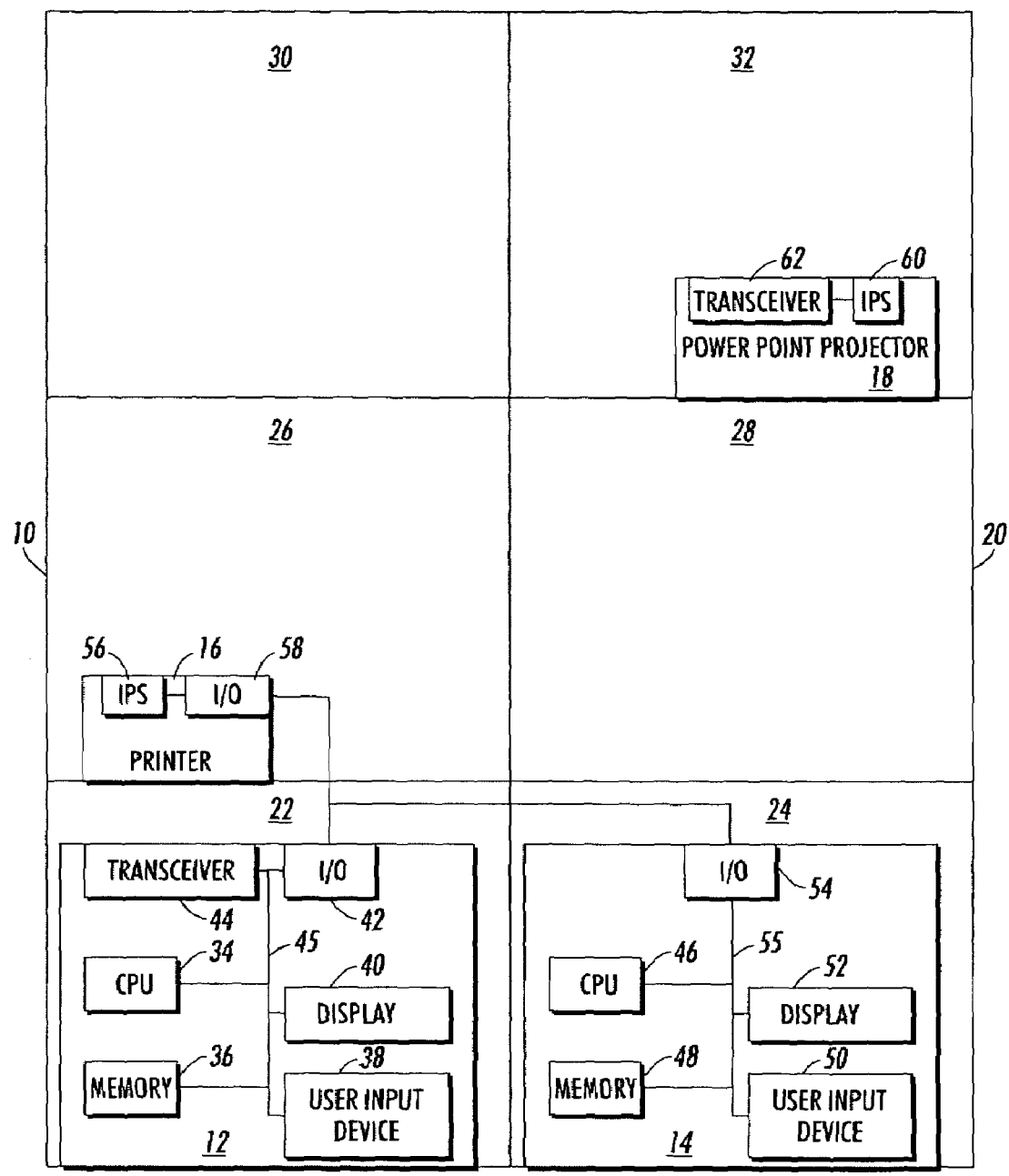
FIG. 1 is a block diagram of a system for locating a device in accordance with embodiments of the present invention.

A system 10 for providing a site specific location of a device in accordance with embodiments of the present invention is illustrated in FIG. 1. The system 10 includes a management system 12, an operator system 14, and a device, such as a printer 16 or a PowerPoint projector 18, although the system can comprise other numbers and types of systems, devices, and components in other configurations. The present invention provides site specific information about the location of a device, such as a particular piece of office or medical equipment.

Referring to FIG. 1, the management system 12, the printer 16, the Power Point projector 18, and the operator system 14 are located in a building 20, although one or more of these devices can be located in other structures in other locations and the movement of other types of devices could be monitored. In this example, the management system 12 is in room 22 and the operator system 14 is in room 24 on first floor of the building 20, the printer 16 is in room 26 and room 28 is empty on the second floor of the building 20, and room 30 is empty and the Power Point projector 18 is in room 32 on the third floor of building 20, although the management system 12, the printer 16, the Power Point projector 18, and the operator system 14 could be in other locations.

Figure 2:
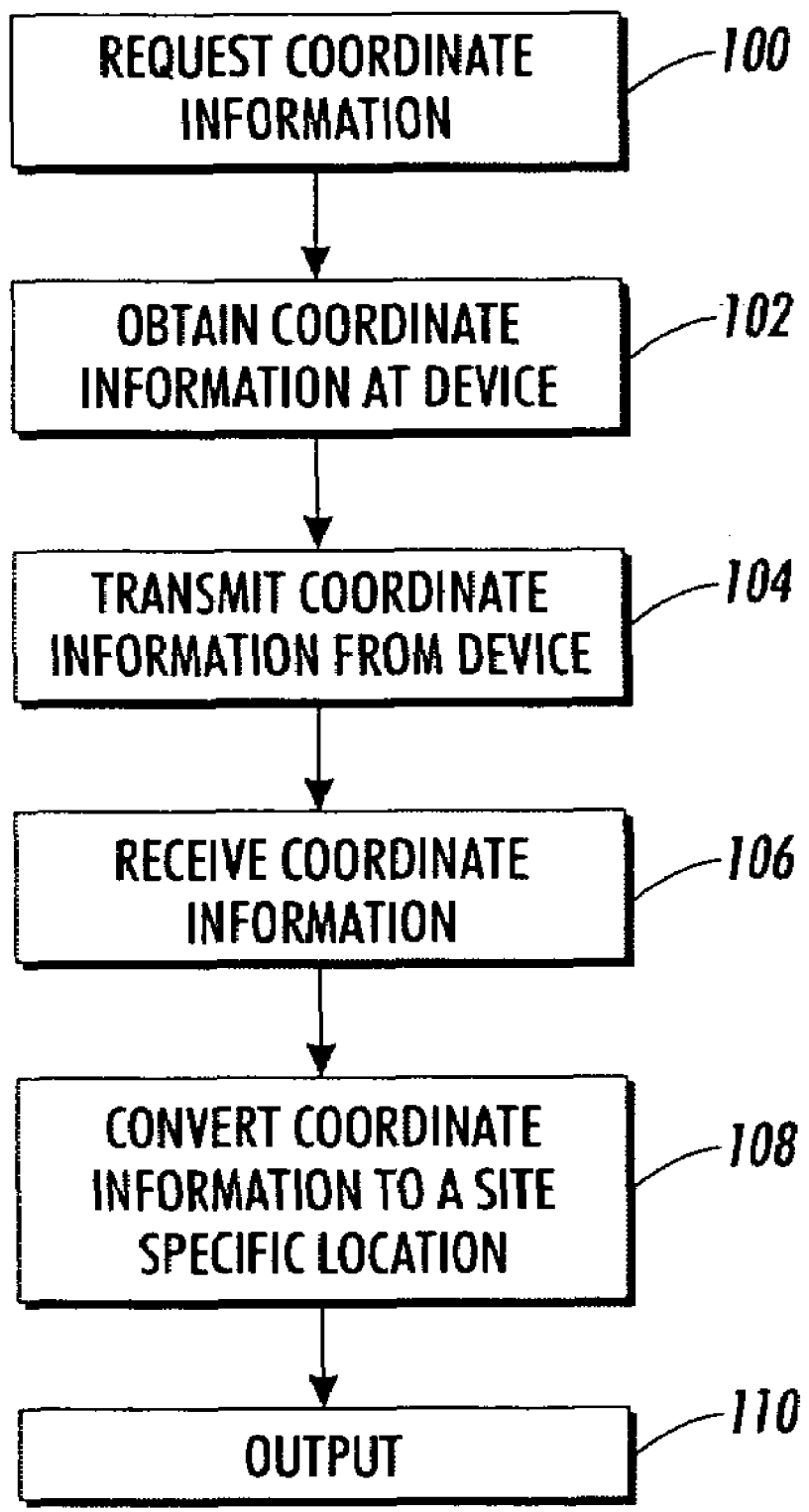
FIG. 2 is a flow chart of a method for locating a device in accordance with embodiments of the present invention.

The management system 12 includes a processor 34, a memory storage device 36, a user input device 38, a display device 40, an input/output interface device 42, and a transceiver 44 which are coupled together by a bus 45 or other link, although other types of management systems comprising other numbers and types of components in other configurations can be used. The processor executes a program of stored instructions for providing a site specific location of a device in accordance with embodiments of the present invention as set forth in FIG. 2 and also as described herein.

The memory storage device 36 stores the programmed instructions for the method for providing a site specific location of a device for execution by the processor 34, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, could be used to store the programmed instructions described herein, as well as other information.

The user input device 38 enables an operator to generate and transmit signals or commands to the processor 34, such as a request for the location of a particular device, such as printer 16 or Power Point projector 18. A variety of different types of user input devices could be used, such as a keyboard or computer mouse.

The display device 40 displays information for the operator of the management system 12, such as the location of a particular device. A variety of different types of display devices could be used, such as a monitor or a printer.

The input/output interface system 42 is used to operatively couple and communicate between the management system 12 and the operator system 14, the printer 16, and the projector 18. A variety of communication systems and/or methods can be used by the input/output interface system 42 to operatively couple and communicate between the management system 12 and the operator system 14, printer 16, and, projector 18, including a direct connection, a local area network, a wide area network, the world wide web, modems and phone lines, or wireless communication technology each having communications protocols. In these embodiments, the printer 16 is coupled to the management system 12 by a hard-wire connection over a local area network and the projector 18 is coupled to the management system 12 by a wireless communication system with a transceiver 44 at the management system 12 and a transceiver 62 at the projector 18, although other types of connections, devices, and networks, such as a wide area network or a receiver at the management system 12 and a transmitter at the projector 18 could be used.

The operator system 14 includes a processor 46, a memory storage device 48, a user input device 50, a display 52, and an input/output interface device 54 which are coupled together by a bus 55 or other link, although other types of operator systems comprising other numbers and types of components in other configurations can be used. The processor 46 executes a program of stored instructions in the memory storage device 48 to operate and control the operation of the operator system 14 and may execute some or all of the programmed instructions for the method for providing a site specific location of a device, although some or all of these programmed instructions could be stored and/or executed elsewhere. The memory storage device 48 stores the programmed instructions described above, although some or all of the programmed instructions could be stored and/or executed elsewhere. The user input device 50, such as a keyboard or computer mouse, enables an operator to generate and transmit signals or commands to the processor 46, such as a request for the location of a particular device, although other types of user input devices could be used. The display device 52, such as a monitor, displays information for the operator of the management system 12, such as the location of a particular device, although other types of display devices could be used. The input/output interface system 54 is used to operatively couple and communicate between the operator system 14 and the management system 12. Although only one operator system 14 is shown, the system 10 can have other numbers and types of operator systems coupled to the management system 12 which can be used to obtain site specific location information about a particular device.

The printer 16 is coupled to the management system 12, although other types of devices can be coupled to them management system, such as a particular piece of office or medical equipment. Since the components of a printer 16, including their connections and operation, are well known, they will not be described in detail here. The printer 16 also includes an indoor positioning system 56 coupled to an input/output interface system 58, although the printer 16 can comprise other numbers and types of components in other configurations. For example, the printer 16 may also include a memory and processor for storing and executing some or all of the programmed instructions for the method for providing a site specific location of a device in accordance with embodiments of the present invention.

The indoor positioning system 56 in the printer 16 obtains coordinate information, such as the longitude, latitude, and altitude of the printer 16, although the indoor positioning system 56 could obtain other types of location information. The coordinate information enables the three-dimensional location of the printer 16 or other device to be determined. The indoor positioning system 56 is a Global Positioning System (GPS) receiver with an antenna sufficient to receive a GPS signal indoors, although the indoor positioning system 56 can comprise other types of position identification systems, such as a high sensitivity GPS receiver that works indoors.

The input/output interface system 58 in the printer 16 can receive and transmit information, such as receiving a request for the current coordinate information for the printer 16 and transmitting the coordinate information. Although an input/output interface system 58 is shown, other types of communication devices can be used, such as a transceiver system or a transmission system which periodically transmits the coordinate information of the printer 16 to the management system 12.

The projector 18 is coupled to the management system 12, although other types of devices can be coupled to them management system, such as a particular piece of office or medical equipment. Since the components of a projector 18, including their connections and operation, are well known, they will not be described in detail here. The projector 18 includes an indoor positioning system 60 coupled to a transceiver system 62, although the projector 18 can comprise other numbers and types of components in other configurations. For example, the projector 18 may also include a memory and processor for storing and executing some or all of the programmed instructions for the method for providing a site specific location of a device in accordance with embodiments of the present invention.

The indoor positioning system 60 in the projector 18 obtains coordinate information, such as the longitude, latitude, and altitude of the printer 16, although the indoor positioning system 60 could obtain other types of location information. The coordinate information enables the three-dimensional location of the projector 18 or other device to be determined. The indoor positioning system 60 is also a GPS receiver with an antenna sufficient to receive a GPS signal indoors, although the indoor positioning system 60 can comprise other types of position identification systems, such as a high sensitivity GPS receiver that works indoors.

The transceiver system 62 in the projector 18 can receive and transmit information, such as receiving a request for the current coordinate information for the projector 18 and transmitting the coordinate information. Although a transceiver system 62 is shown, other types of communication devices can be used, such as an input/output interface system 58 periodically through which the projector 18 transmits the coordinate information of the projector 18 to the management system 12.

A method for providing a site specific location of a device, such as a particular piece of office or medical equipment, in accordance with embodiments of the present invention will now be described with reference to FIG. 1. In step 100, an operator at the user input device 50 at operator system 14 or at the user input device 38 at the management system 12 can transmit a request for coordinate information for a particular device, such as the printer 16 or the projector 18. If the user input device 50 at the operator system 14 is used, the request is sent from the I/O interface system 54 in the operator system 14 to the I/O interface system 42 at the management system 12.

When the request for location information is received, the management system 12 transmits a request to the particular device. If the device is coupled to the management system 12 by a hard wired connection, such as printer 16, then the request is sent from the I/O interface system 42 to the I/O interface system 58. If the device is wirelessly coupled to the management system 12, such as projector 18, then the request is sent from the transceiver system 44 to the transceiver system 62. Although in these embodiments, a request is sent to the devices, such as printer 16 and projector 18, for an update of the particular location of the device, other protocols could be used, such as having the devices transmit their coordinate information to management system 12 upon installation, re-installation, or movement of the device, such as printer 16 or projector 18, without the need for a request for an update of the location of the device.

In step 102, the device, printer 16 or projector 18, obtains the current coordinate information for the device using the indoor positioning system 56 in printer 16 or indoor positioning system 60 in projector 18, such as a GPS receiver, although other types of positioning identification systems could be used. The coordinate information includes the longitude, latitude, and altitude of the device, although other types of coordinate information could be obtained.

In steps 104 and 106, the device, such as printer 16 or projector 18, which received the request for coordinate information, transmits the obtained coordinate information to the management system 12. If the device which received the request for coordinate information is the printer 16, then the coordinate information is sent from the I/O interface system 58 at printer 16 to the I/O interface system 42 at management system 12. If the device which received the request for coordinate information is the projector 18, then the coordinate information is sent from the transceiver system 62 at projector 18 to the transceiver system 44 at management system 12.

In step 108, the management system 12 converts the coordinate information for the device, such as printer 16 or projector 18, to a site specific location. For example, the management system 12 will use the coordinate information to identify a particular site, such as building 20, based on the longitude and latitude. The management system 12 will retrieve information stored in memory about the building 20, such as the number of floors and the locations of different rooms 22 and 24 on the first floor, rooms 26 and 28 on the second floor, and rooms 30 and 32 on the third floor of building 20.

The management system 12 will use the obtained longitude, latitude, and altitude for the device that the operator is trying to locate and will convert the coordinate information to site specific location information. For example, if an operator was looking for the printer 16, the management system 12 would convert the coordinate information for the printer 16 to the site specific location information of room 26 on the second floor of building 20, although the coordinate information could be converted to other types of site specific location information. In another example, if an operator was looking for the projector 18, the management system 12 would convert the coordinate information for the projector 18 to a site specific location information of room 32 on the third floor of building 20, although the coordinate information could be converted to other types of site specific location information.

The management system 12 can also determine the best route to the device, such as printer 16 and projector 18, the operator is trying to locate based on the coordinate information and stored information about the identified site, such as building 20. The management system 12 can transmit the determined directions to the operator with the site specific location information in the same manner the site specific location information is output.

The management system 12 can also identify the location of multiple numbers of the same device an operator is trying to locate and can determine the closest one of the desired devices based on the coordinate information for the multiple devices and stored information about the identified site, such as building 20. The management system 12 can transmit the site specific location information of the closest one of the desired devices along with direction to the in the same manner the site specific location information is output.

In step 110, the site specific location information is output for display on display device 40 of management system 12, although the site specific information could be output to other locations, such as to memory 36 in management system 12 or to the operator system 14. If the site specific location information is sent from the I/O interface system 42 of the management system 12 to the I/O interface system 54 of the operator system 14, although the site specific location information can be sent to the operator system 14 in other manners. At the operator system, 14, the site specific location information is output for display on display device 52 of operator system 14, although the site specific location information could be output to other locations, such as to memory 48 in the operator system 14.

Accordingly, with the present invention an operator of the system 10 can quickly and easily identify the location a particular device, such as a piece of office equipment or a particular medical device. For example, in a medical setting an operator would be able to quickly track down the location of a needed piece of medical equipment in an emergency. Additionally, with the present invention the potential of operator error in failing to update information about the location of a device or incorrectly recording the location of a device is eliminated.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A system comprising:
    memory storing site specific geographical location information of a plurality of sites in an area;
    a receiving system that receives coordinate information from a device;
    an identification system that identifies which one of the sites of the area that the device is located based on a predetermined association of the received coordinate information and said stored site specific geographical location information; and
    an output system that outputs the site specific geographical location information of the identified site.

2. The system as set forth in claim 1, further comprising:
    a coordinate retrieval system that obtains coordinate information at the device; and
    a transmission system that transmits the obtained coordinate information from the device.

3. The system as set forth in claim 2, further comprising a request system that requests the coordinate retrieval system to obtain the coordinate information of the device and the transmission system to transmit the coordinate information of the device.

4. The system as set forth in claim 1, wherein coordinate information comprises a longitude, a latitude, and an altitude of the device.

5. The system as set forth in claim 1, the identification system further comprises:
a site information retrieval system that obtains information about the identified one of the plurality of sites; and
a determination system that determines site specific location information of the device based on the obtained information of the identified one of the plurality of sites and the received coordinate information.

6. The system as set forth in claim 5, wherein the determination system determines directions to the device based on the obtained information about the site and the received coordinate information and the output system outputs the directions with the site specific location information of the device.

7. The system as set forth in claim 5, wherein the receiving system receives the coordinate information for two or more of the same types of devices, the determination system determines which of the devices is the closest to an operator based on the obtained information about the site and the received coordinate information, and the output system outputs the site specific location information of the device determined to be the closest.

8. The system as set forth in claim 1, wherein the outputting comprises displaying the site location information of the device.

9. The system as set forth in claim 1, wherein the outputting comprises storing the site location information of the device.

10. The system as set forth in claim 1, wherein the site specific geographic location information of identified sites specify locations within a building.

11. A method comprising the steps of:
accessing stored site specific geographical location information of a plurality of sites in an area;
receiving coordinate information from a device;
identifying which one of the plurality of sites of the area that the device is located based on a predetermined association of the received coordinate information and said stored site specific geographical location information; and
outputting the site specific location geographical information of the identified site.

12. The method as set forth in claim 11, further comprising the steps of:
obtaining coordinate information at the device; and
transmitting the obtained coordinate information from the device.

13. The method as set forth in claim 12, further comprising the steps of requesting the device to obtain and transmit the coordinate information of the device.

14. The method as set forth in claim 11, wherein coordinate information comprises a longitude, a latitude, and an altitude of the device.

15. The method as set forth in claim 11, wherein the step of identifying further comprises:
storing site specific information of a plurality of sites for an area;
obtaining information about the identified one of the plurality of sites; and
determining site specific location information of the device based on the obtained information of the identified one of the plurality of sites and the received coordinate information.

16. The method as set forth in claim 15, wherein the step of identifying further comprises determining directions to the device based on the obtained information about the site and the received coordinate information and the outputting outputs the directions with the site specific location information of the device.

17. The method as set forth in claim 15, wherein the step of receiving further comprises receiving the coordinate information for two or more of the same types of devices, the step of determining determines which of the devices is the closest to an operator based on the obtained information about the site and the received coordinate information for the devices, and the step of outputting outputs the site specific location information of the device determined to be the closest.

18. The method as set forth in claim 11, wherein the step of outputting comprises displaying the site specific location information of the device.

19. The method as set forth in claim 11, wherein the step of outputting comprises storing the site specific location information of the device.

20. The method as set forth in claim 11, wherein the site specific geographic location information of identified sites specify locations within a building.

21. A computer readable medium having stored thereon instructions for providing a site specific location of a device, which when executed by a processor, causes the processor to perform the steps of:
accessing stored site specific geographical location information of a plurality of sites in an area;
receiving coordinate information from a device;
identifying which one of the plurality of sites of the area that the device is located based on a predetermined association of the received coordinate information and said stored site specific geographical location information; and
outputting the site specific geographical location information of the identified site.

22. The medium as set forth in claim 21, further comprising the steps of:
obtaining coordinate information at the device; and transmitting the obtained coordinate information from the device.

23. The medium as set forth in claim 22, further comprising the step of requesting the device to obtain and transmit the coordinate information of the device.

24. The medium as set forth in claim 21, wherein coordinate information comprises a longitude, a latitude, and an altitude of the device.

25. The medium as set forth in claim 21, wherein the instructions further cause the processor to perform the steps of:
storing site specific information of a plurality of sites for an area;
obtaining information about the identified one of the plurality of sites; and
determining site specific location information of the device based on the obtained information of the identified one of the plurality of sites and the received coordinate information.

26. The method as set forth in claim 25, wherein the step of identifying further comprises determining directions to the device based on the obtained information about the site and the received coordinate information and the outputting outputs the directions with the site specific location information of the device.

27. The method as set forth in claim 25, wherein the step of receiving further comprises receiving the coordinate information for two or more of the same types of devices, the step of determining determines which of the devices is the closest to an operator based on the obtained information about the site and the received coordinate information for the devices, and the step of outputting outputs the site specific location information of the device determined to be the closest.

28. The medium as set forth in claim 21, wherein the step of outputting comprises displaying the site specific location information of the device.

29. The medium as set forth in claim 21, wherein the step of outputting comprises storing the site specific location information of the device.

30. The medium as set forth in claim 21, wherein the site specific geographic location information of identified sites specify locations within a building.

* * * * *